(12) United States Patent
Thiele et al.

(10) Patent No.: US 8,439,425 B2
(45) Date of Patent: May 14, 2013

(54) SENSOR HOUSING

(75) Inventors: Steven Ray Thiele, Marysville, OH (US); Jeremy Brandon Josefovsky, Piqua, OH (US)

(73) Assignee: Honda Motor Co., Ltd., Tokyo (JP)

( * ) Notice: Subject to any disclaimer, the term of this patent is extended or adjusted under 35 U.S.C. 154(b) by 352 days.

(21) Appl. No.: 12/764,137

(22) Filed: Apr. 21, 2010

(65) Prior Publication Data
US 2011/0259661 A1 Oct. 27, 2011

(51) Int. Cl.
*B60J 5/06* (2006.01)

(52) U.S. Cl.
USPC .................... 296/146.1; 296/146.4; 296/155; 49/26

(58) Field of Classification Search ........... 296/146.1, 296/146.4, 146.8, 146.9, 152, 155; 49/26
See application file for complete search history.

(56) References Cited

U.S. PATENT DOCUMENTS

| | | | |
|---|---|---|---|
| 6,720,884 B2 | 4/2004 | O'Connor et al. | |
| 6,759,950 B2 | 7/2004 | Nishimoto et al. | |
| 7,000,352 B2 * | 2/2006 | Ishihara et al. | 49/28 |
| 7,226,112 B2 * | 6/2007 | Ward | 296/146.8 |
| 7,284,785 B2 | 10/2007 | Gotou et al. | |
| 7,393,043 B2 | 7/2008 | Kargilis et al. | |
| 7,712,256 B2 * | 5/2010 | Kato et al. | 49/26 |
| 7,893,831 B2 * | 2/2011 | Hoshina et al. | 340/545.1 |
| 7,959,211 B2 * | 6/2011 | Jimenez et al. | 296/146.4 |
| 2005/0179415 A1 * | 8/2005 | Nakano et al. | 318/478 |
| 2006/0087418 A1 * | 4/2006 | Takeuchi | 340/438 |
| 2007/0273545 A1 * | 11/2007 | Hoshina et al. | 340/686.1 |
| 2009/0178343 A1 | 7/2009 | Zimmer et al. | |
| 2009/0289469 A1 | 11/2009 | Thiele | |
| 2010/0044528 A1 * | 2/2010 | Jimenez | 248/74.1 |
| 2010/0045065 A1 * | 2/2010 | Brown et al. | 296/146.4 |

FOREIGN PATENT DOCUMENTS

JP 2009046038 * 3/2009

* cited by examiner

*Primary Examiner* — Glenn Dayoan
*Assistant Examiner* — Gregory Blankenship
(74) *Attorney, Agent, or Firm* — Clifford Vaterlaus; Emerson Thomson Bennett

(57) ABSTRACT

A sensor housing which may be used to house a pinch sensor may include: a first portion having a sensor attaching surface and a first connecting member; a second portion that at least partially covers the sensor attaching surface and that has a second connecting member; and, an installation surface that can be used to install the sensor housing onto a vehicle. The second portion may be adjustable with respect to the first portion between: (1) a first condition where the second portion at least partially uncovers the sensor attaching surface and where a sensor can be attached to the sensor attaching surface; and, (2) a second condition where the second portion at least partially covers the sensor and where the second connecting member can be connected to the first connecting member.

17 Claims, 7 Drawing Sheets

SENSOR HOUSING

I. BACKGROUND

A. Field of Invention

This invention generally relates to methods and apparatuses concerning vehicle sensors and more specifically relates to methods and apparatuses concerning a sensor housing.

B. Description of the Related Art

It is well known in the automotive industry to provide vehicles with pinch sensors (also known as anti-pinch sensors) that prevent a door of the vehicle from attaining a closed position when an obstruction, such as the arms, legs, or fingers of a passenger, interferes or obstructs the door. Typically, the pinch sensor is attached to a sensor housing and then the housing is installed onto the vehicle.

Known sensor housings, such as sensor housing 1 shown in FIGS. 5-7, are formed of rubber, typically a thermoplastic olefin (TPO), and include a relatively complex molding. Before the pinch sensor 2 (one example shown in FIG. 2) can be attached to the sensor housing 1, the sensor housing 1 must be opened (shown in FIG. 6) to allow access to the sensor attaching surface 3. This opening of the sensor housing 1 permanently deforms the molding and thus results in a loose fit of the sensor housing 1 to the vehicle.

Known attempted solutions to this problem include applying adhesives and ethylene propylene (EPT) foam in an effort to make the molding stick together. Another known attempted solution is to hand work the sensor housing after it has been installed to the vehicle. Both of these attempted solutions are difficult and costly to apply in mass production and are difficult to quality control.

Another known attempted solution to this problem is to form the sensor housing out of ethylene-propylene-diene (EPDM). The use of this material would eliminate the "memory" effect of the housing opening process and allow the housing to return to its original form. However, the use of EPDM greatly increases the cost of the sensor housing and thus is not a practical solution.

What is needed is a sensor housing and method of using a sensor housing that is simpler, less expensive, and more reliable than known sensor housings.

II. SUMMARY

According to one embodiment of this invention, a sensor assembly may comprise a sensor housing that comprises: a first portion having a sensor attaching surface and a first connecting member; a second portion that at least partially covers the sensor attaching surface and that has a second connecting member; and, an installation surface that can be used to install the sensor housing onto an associated vehicle. The second portion may be adjustable with respect to the first portion between: (1) a first condition where the second portion at least partially uncovers the sensor attaching surface and where an associated sensor can be attached to the sensor attaching surface; and, (2) a second condition where the second portion at least partially covers the associated sensor and where the second connecting member can be connected to the first connecting member.

According to another embodiment of this invention, a method may comprise the steps of: (A) providing a sensor housing comprising: (1) a first portion having a sensor attaching surface and a first connecting member; and, (2) a second portion that at least partially covers the sensor attaching surface and that has a second connecting member; (B) moving the second portion with respect to the first portion to at least partially uncover the sensor attaching surface; (C) attaching a sensor to the sensor attaching surface; (D) moving the second portion with respect to the first portion to at least partially cover the sensor; and, (E) connecting the second connecting member to the first connecting member.

According to yet another embodiment of this invention, a vehicle may comprise: a frame; at least one ground engaging wheel mounted to the frame; a locomotion source mounted to the frame and used in providing locomotion for the vehicle; a body mounted to the frame; a door that is moveable with respect to the body between an open position granting access to the interior of the body and a closed position preventing access to the interior of the body; a sensor assembly comprising: a pinch sensor that is used to prevent the door from attaining the closed position when an associated obstruction interferes; and, a sensor housing comprising: a first portion having a sensor attaching surface and a first connecting member; a second portion that at least partially covers the sensor attaching surface and that has a second connecting member; and, an installation surface that is used to install the sensor housing onto the vehicle. The second portion is adjusted with respect to the first portion from: (1) a first condition where the second portion at least partially uncovers the sensor attaching surface and where the pinch sensor is attached to the sensor attaching surface; to, (2) a second condition where the second portion at least partially covers the pinch sensor and where the second connecting member is connected to the first connecting member.

One advantage of this invention is that a sensor housing can be relatively simple to manufacture and use.

Another advantage of this invention is that a sensor housing can be made in a more economical manner.

Yet another advantage of this invention is that a sensor housing can be made that is very reliable to install on a vehicle.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
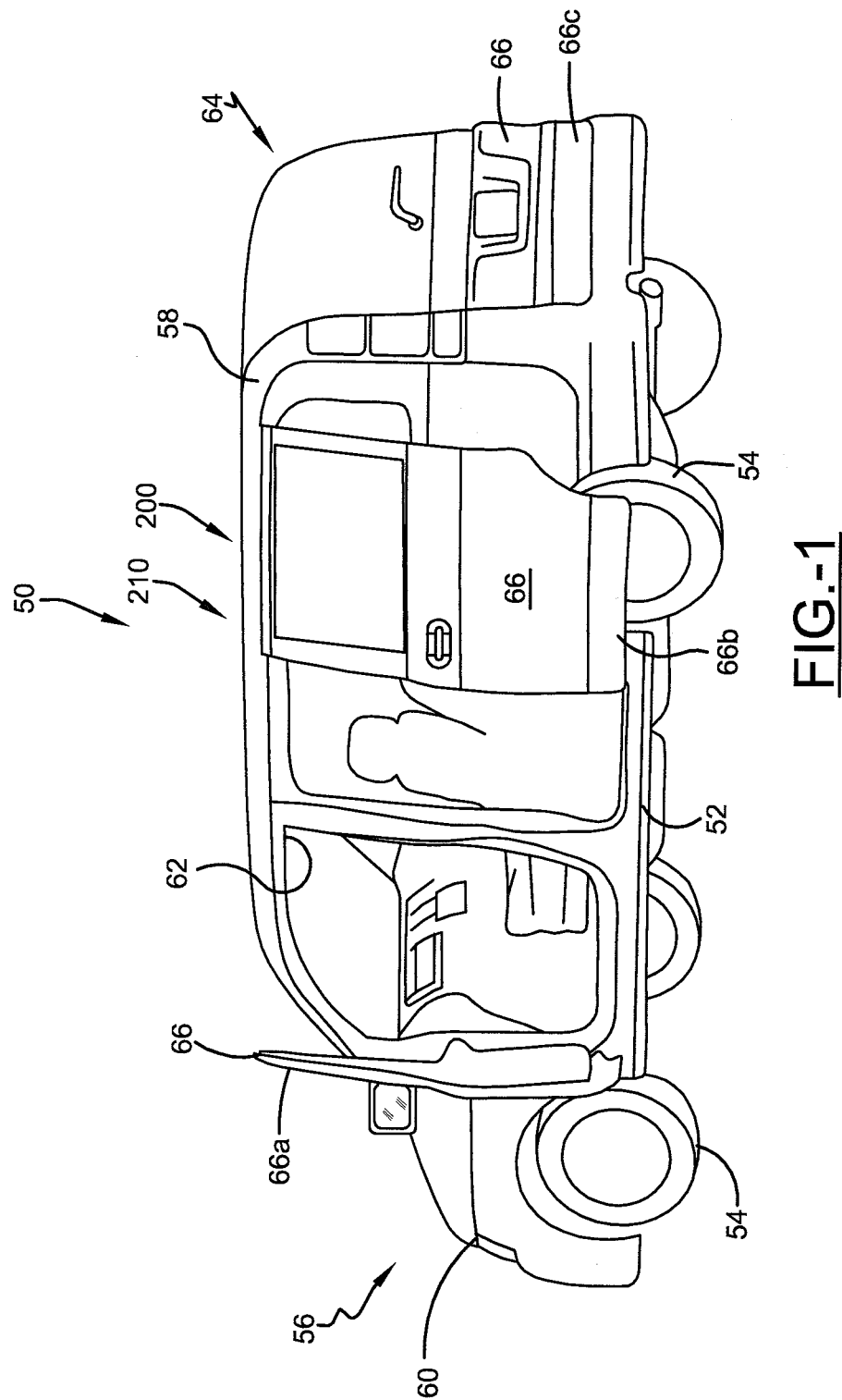
FIG. 1 is a perspective side view of a vehicle.

Referring now to the drawings wherein the showings are for purposes of illustrating embodiments of the invention only and not for purposes of limiting the same, and wherein like reference numerals are understood to refer to like components, FIG. 1 shows a vehicle 50 that may be equipped with one or more sensor housings 210 according to this invention. While the vehicle 50 shown is a van, it is to be understood that the sensor housing 210 of this invention will work with any vehicle chosen with the sound judgment of a person of skill in the art and may have non-vehicle applications as well. The vehicle 50 may include a frame 52, one or more ground engaging wheels 54 mounted to the frame 52, and a locomotion source 56, such as an engine or motor, mounted to the frame 52, for use in providing locomotion for the vehicle 50. The vehicle 50 may also have a body 58 mounted to the frame 52 and that defines one or more compartments. The body may define, for some non-limiting examples, a locomotion compartment 60 which houses the locomotion source 56, a passenger compartment 62 which houses one or more passengers, and a storage compartment 64 which may be used to house luggage or other cargo. The vehicle 50 may also have at least one door 66 that is moveable with respect to the body 58 between an open position granting access to the interior of the body (and thus may provide access to one or more of the compartments 60, 62, 64) and a closed position preventing access to the interior of the body 58. The vehicle shown has a door 66a that pivots about a vertical axis between open and closed positions, a door 66b that slides parallel to a longitudinal axis of the vehicle between open and closed positions, and a door 66c that pivots about a horizontal axis between open and closed positions (sometimes referred to as a tailgate). It is to be understood that the doors 66a, 66b, 66c are exemplary only. As the operation of all such doors is well known to those of skill in the art, further details will not be provided here.

Figure 2:
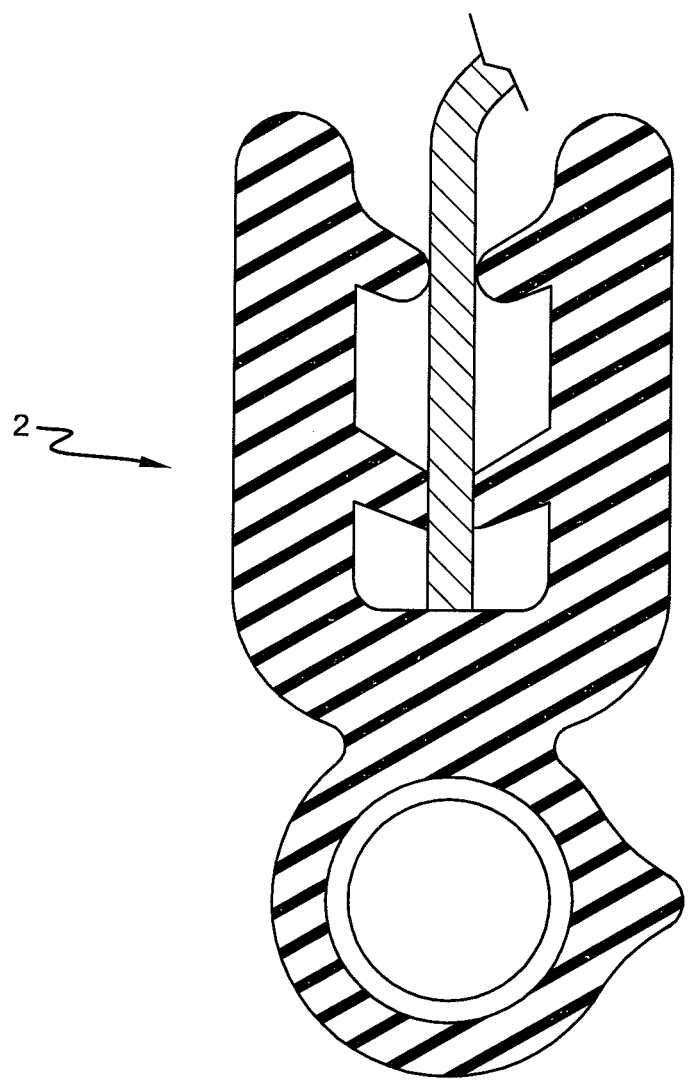
FIG. 2 is a cross-sectional view of a pinch sensor.
Figure 3:
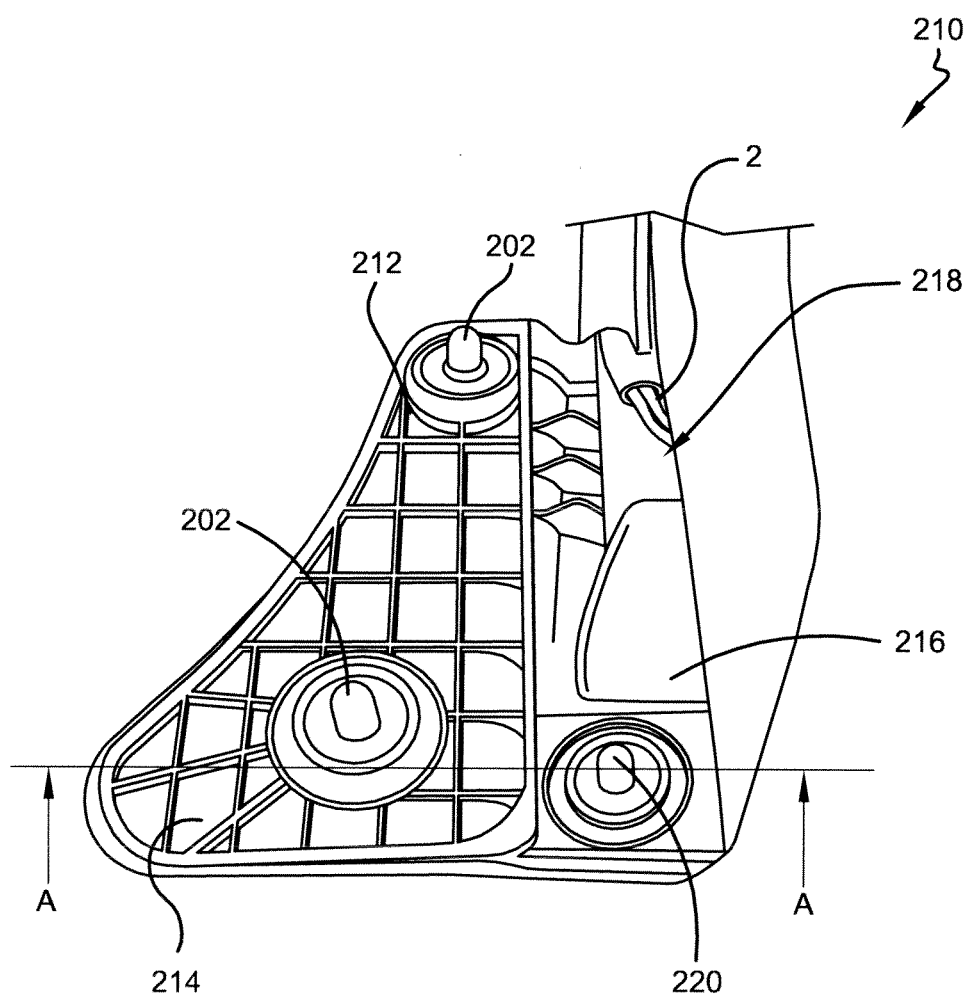
FIG. 3 is a side view of a sensor housing showing a connecting member in partial cut-away.

With reference now to FIGS. 1-3, a sensor assembly 200 may include the sensor housing 210 and at least one sensor 2 (see FIG. 2). The sensor 2 described and shown is known as a pinch sensor (sometimes as an anti-pinch sensor) but the sensor housing 210 of this invention may be used with any type of sensor chosen with the sound judgment of a person of skill in the art. As the various types and uses of pinch sensors are well known to those of skill in the art, further details will not be provided here. The sensor housing 210 may have an installation surface 212 that is used to install the sensor housing 210 onto the vehicle 50 in any manner chosen with the sound judgment of a person of skill in the art. A pair of connectors 202, 202 may be used for this purpose. For the embodiment shown, the sensor housing 210 is attached to a door 66 but it should be understood that the portion of the vehicle 50 to which the sensor housing 210 is installed can be any chosen with the sound judgment of a person of skill in the art.

Figure 6:
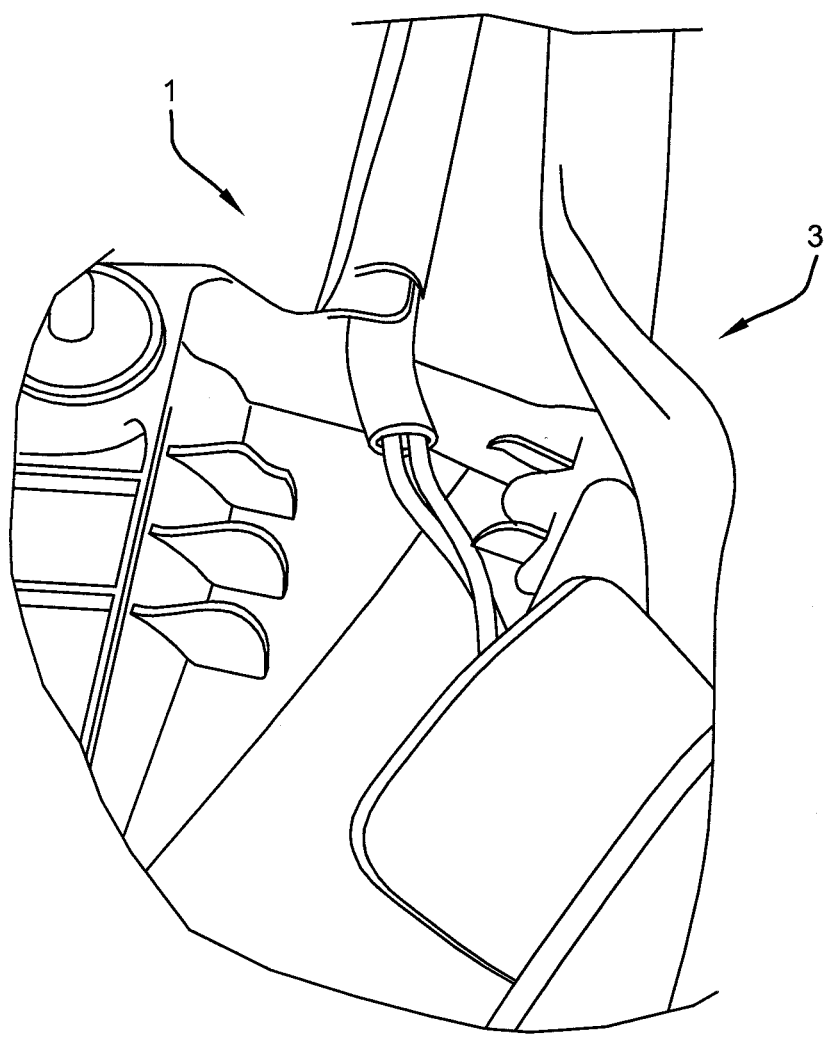
FIG. 6 shows the prior art sensor housing of FIG. 5 opened so that a sensor can be attached.
Figure 7:
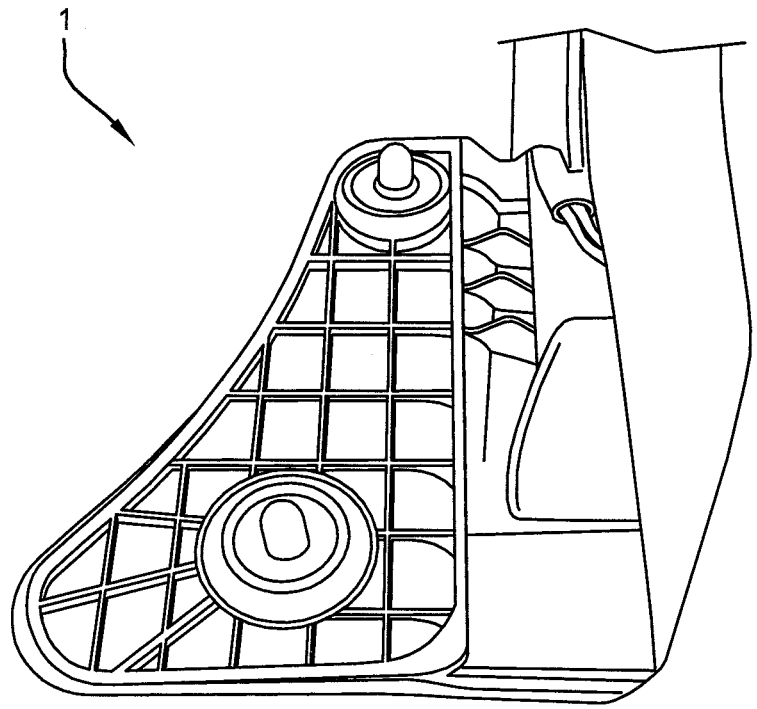
FIG. 7 is a side view of the prior art sensor housing of FIG. 5.

With reference now to FIGS. 3, 4a, 4b and 4c, the sensor housing 210 may include first and second portions 214, 216. The first portion 214 may have a sensor attaching surface 218 and a first connecting member 220. The sensor 2 may be attached to the sensor attaching surface 218 in any manner chosen with the sound judgment of a person of skill in the art. The second portion 216 is used to at least partially cover the sensor attaching surface 218 (and thus the sensor 2 when it is attached to the sensor attaching surface 218) and may have a second connecting member 222. In operation, the second portion 216 is adjusted with respect to the first portion 214 from: (1) a first condition (shown in FIG. 4b and similar to that shown in FIG. 6) where the second portion 216 at least partially uncovers the sensor attaching surface 218 and where the sensor 2 may be attached to the sensor attaching surface 218; to, (2) a second condition (shown in FIG. 4c) where the second portion 216 at least partially covers the sensor 2 and where the second connecting member 222 may be connected to the first connecting member 220.

Figure 4A:
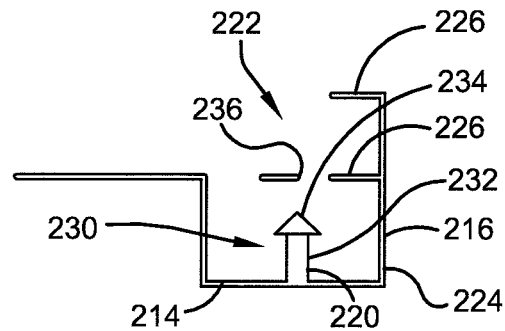
FIG. 4a is a schematic representation of a sectional view along line A-A from FIG. 3 before assembly has begun.
Figure 4B:
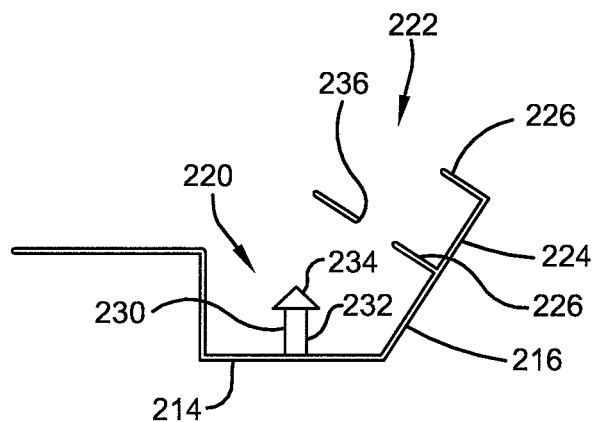
FIG. 4b is view similar to that shown in FIG. 4a but showing the sensor housing opened so that the sensor can be attached.
Figure 4C:
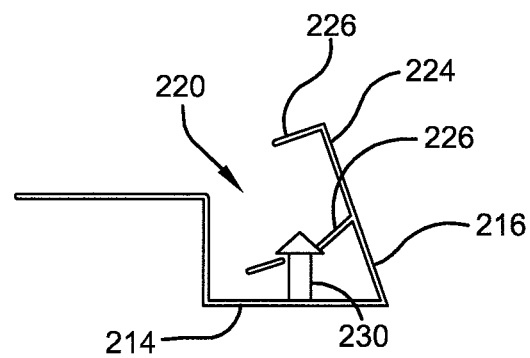
FIG. 4c is view similar to that shown in FIGS. 4a and 4b but showing the sensor housing closed so that the sensor housing can be installed onto a vehicle.
Figure 5:
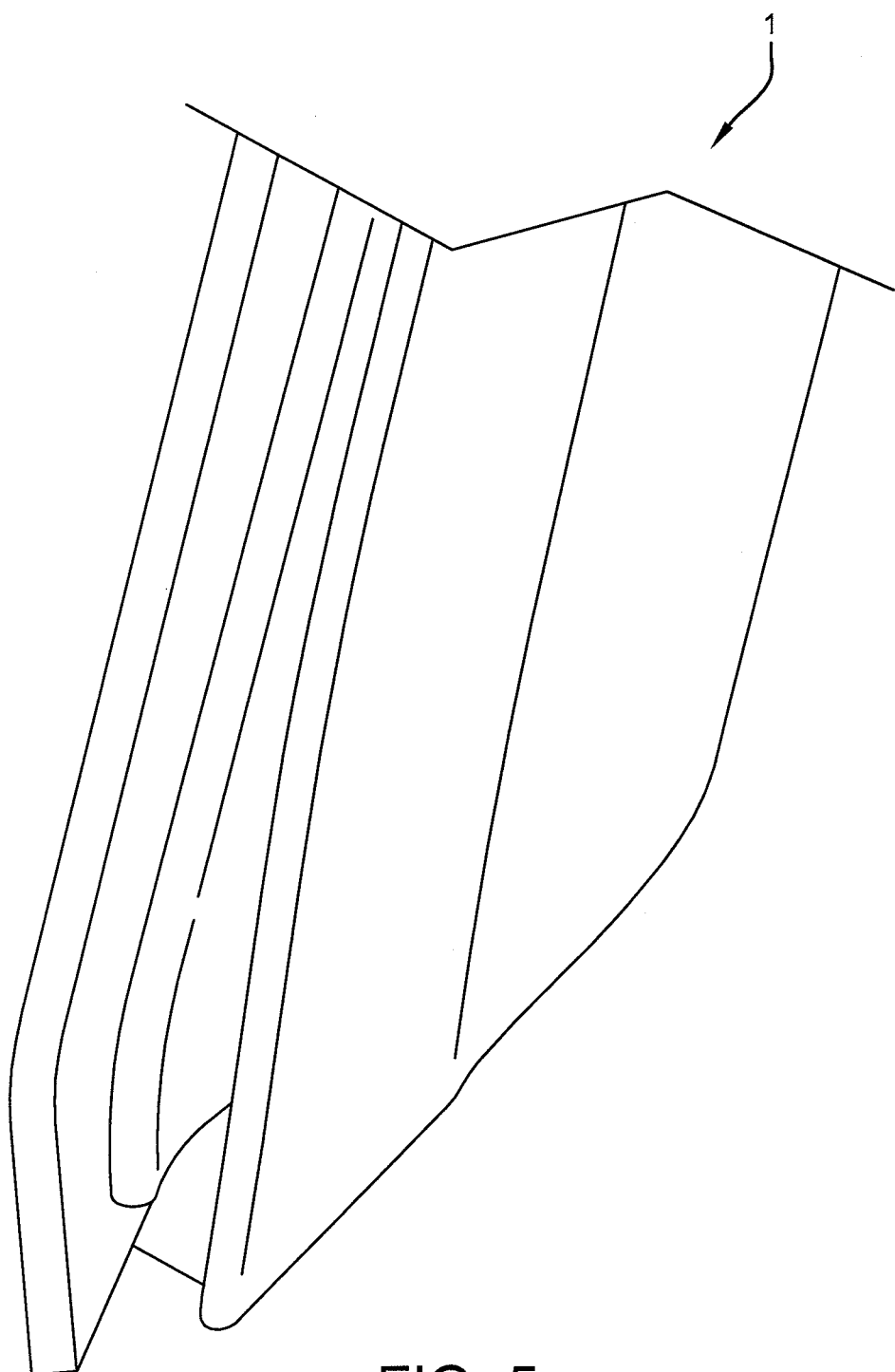
FIG. 5 is an end view of a prior art sensor housing.

With reference now to FIGS. 1-4c, embodiments of using the sensor housing 210 will now be described. First, the second portion 216 is moved with respect to the first portion 214 to at least partially uncover the sensor attaching surface 218, as shown in FIG. 4b. This relative motion can be accomplished in any manner chosen with the sound judgment of a person of skill in the art. For the embodiment shown, the second portion 216 is pivoted with respect to the first portion 214. If the sensor housing 210 is formed of a flexible material, this pivotal motion is easily accomplished based on material properties. However, it is also contemplated to provide for this motion with a hinge or the like. Once the second portion 216 is moved with respect to the first portion 214, the sensor 2 is attached to the sensor attaching surface 218. As this attachment procedure is well known to those of skill in the art, further details will not be provided here. After the sensor 2 is attached, the second portion 216 of the sensor housing 210 is moved with respect to the first portion 214 to at least partially cover the sensor 2. This relative motion can be accomplished in any manner chosen with the sound judgment of a person of skill in the art but, as noted above, may for the embodiment shown be a relative pivoting motion. The second connecting member 222 is then connected to the first connecting member 220 as shown in FIG. 4c. In one embodiment, this is accomplished by engaging the connector 230 with the opening 236. Finally, the sensor housing 210 with the sensor 2 attached, is installed onto the vehicle 50 by connecting the installation surface 212 to the vehicle 50. In one embodiment, this installation is accomplished by connecting the connectors 202, 202 to the door 66.

With reference now to FIG. 3, the sensor housing 210 may be formed in any manner and out of any material chosen with the sound judgment of a person of skill in the art. In one embodiment, the sensor housing 210 is formed out of an elastomeric material in a molding process. In a more specific embodiment, the sensor housing 210 is formed out of a thermoplastic olefin.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A sensor assembly comprising:
   sensor housing comprising:
      a first portion having a sensor attaching surface and a first connecting member;
      a second portion that at least partially covers the sensor attaching surface and that has a second connecting member;
      wherein the second portion is adjustable with respect to the first portion between: (1) a first condition where the second portion at least partially uncovers the sensor attaching surface and where an associated sensor can be attached to the sensor attaching surface; and, (2) a second condition where the second portion at least partially covers the associated sensor and where the second connecting member can be connected to the first connecting member;
      wherein the second portion comprises: a first segment that extends substantially perpendicularly from the first portion before the second connecting member is connected to the first connecting member; and, a second segment that extends substantially perpendicularly from the first segment and substantially parallel to the first portion before the second connecting member is connected to the first connecting member; and, an installation surface that can be used to install the sensor housing onto an associated vehicle.

2. The sensor assembly of claim 1 further comprising: a pinch sensor that is attached to the sensor attaching surface and that is used to prevent a door of the associated vehicle from closing over an associated obstruction.

3. The sensor assembly of claim 1 wherein the sensor housing is formed out of an elastomeric material in a molding process.

4. The sensor assembly of claim 1 wherein the sensor housing is formed out of a thermoplastic olefin.

5. The sensor assembly of claim 1 wherein:
the first connecting member comprises a connector;
the second connecting member comprises an opening; and,
the connector engages the opening when the second portion is adjusted with respect to the first portion into the second condition.

6. The sensor assembly of claim 5 wherein the connector comprises a head that is inserted through the opening when the second portion is adjusted with respect to the first portion into the second condition.

7. The sensor assembly of claim 1 wherein the second portion further comprises:
a third segment that extends substantially perpendicularly from the first portion and substantially parallel to the second segment.

8. A method of housing a sensor comprising the steps of:
(A) providing a sensor housing comprising: (1) a first portion having a sensor attaching surface and a first connecting member; and, (2) a second portion that at least partially covers the sensor attaching surface and that has a second connecting member;
(B) moving the second portion with respect to the first portion to at least partially uncover the sensor attaching surface;
(C) attaching the sensor to the sensor attaching surface;
(D) moving the second portion with respect to the first portion to at least partially cover the sensor;
(E) connecting the second connecting member to the first connecting member; and,
wherein step (A) comprises the step of: providing the second portion to comprise: a first segment that extends substantially perpendicularly from the first portion before the second connecting member is connected to the first connecting member; and, a second segment that extends substantially perpendicularly from the first segment and substantially parallel to the first portion before the second connecting member is connected to the first connecting member.

9. The method of claim 8 wherein:
the sensor is a pinch sensor; and,
the method further comprises the step of: installing the sensor housing and the pinch sensor onto a vehicle for use in preventing a door of the vehicle from closing over an associated obstruction.

10. The method of claim 8 wherein:
step (E) comprises the step of: inserting a head portion of the connector through the opening.

11. The method of claim 8 wherein:
step A comprises the step of: providing the first portion with an installation surface; and,
the method further comprises the step of: installing the sensor housing and the sensor onto a vehicle by connecting the installation surface to the vehicle.

12. A vehicle comprising:
a frame;
at least one ground engaging wheel mounted to the frame;
a locomotion source mounted to the frame and used in providing locomotion for the vehicle;
a body mounted to the frame;
a door that is moveable with respect to the body between an open position granting access to an interior of the body and a closed position preventing access to the interior of the body;
a sensor assembly comprising:
a pinch sensor that is used to prevent the door from attaining the closed position when an associated obstruction interferes; and,
a sensor housing comprising:
a first portion having a sensor attaching surface and a first connecting member;
a second portion that at least partially covers the sensor attaching surface and that has a second connecting member;
wherein the second portion is adjusted with respect to the first portion from: (1) a first condition where the second portion at least partially uncovers the sensor attaching surface and where the pinch sensor is attached to the sensor attaching surface; to, (2) a second condition where the second portion at least partially covers the pinch sensor and where the second connecting member is connected to the first connecting member;
wherein the second portion comprises: a first segment that extends substantially perpendicularly from the first portion before the second connecting member is connected to the first connecting member; and, a second segment that extends substantially perpendicular from the first segment and substantially to the first portion before the second connecting member is connected to the first connecting member; and,
an installation surface that is used to install the sensor housing onto the vehicle.

13. The vehicle of claim 12 wherein the sensor housing is formed out of an elastomeric material in a molding process.

14. The vehicle of claim 12 wherein:
the first connecting member comprises a connector;
the second connecting member comprises an opening; and,
the connector engages the opening when the second portion is adjusted with respect to the first portion into the second condition.

15. The vehicle of claim 14 wherein the connector comprises a head that is inserted through the opening when the second portion is adjusted with respect to the first portion into the second condition.

16. The vehicle of claim 12 wherein the door is slidable with respect to the body between the open position and the closed position.

17. The vehicle of claim 12 wherein the door is pivotable with respect to the body between the open position and the closed position.

* * * * *